July 5, 1927.
R. HUTCHINSON
1,634,259
HEAT TREATMENT OF WHEATEN CEREALS
Filed July 26, 1924
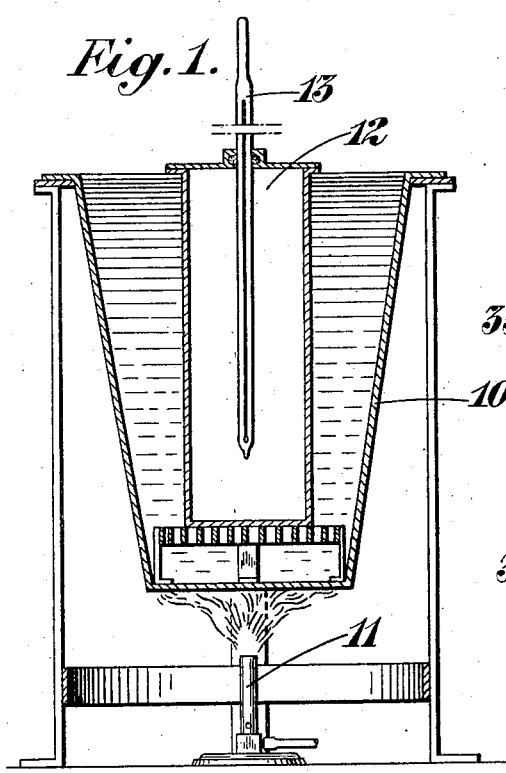
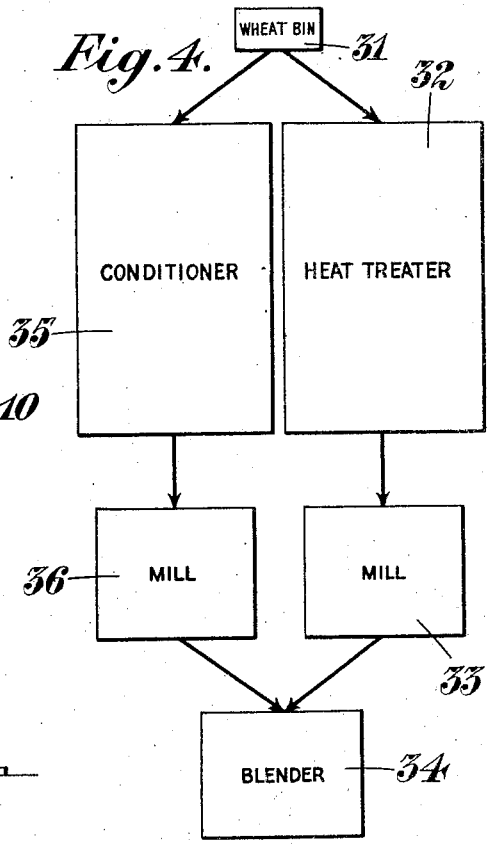
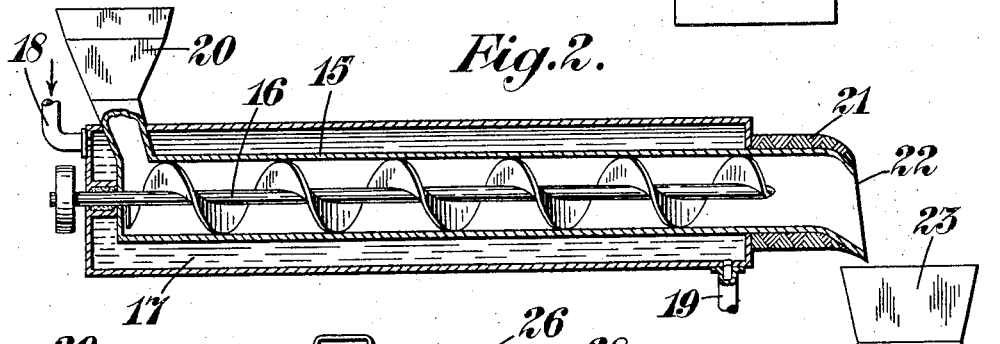
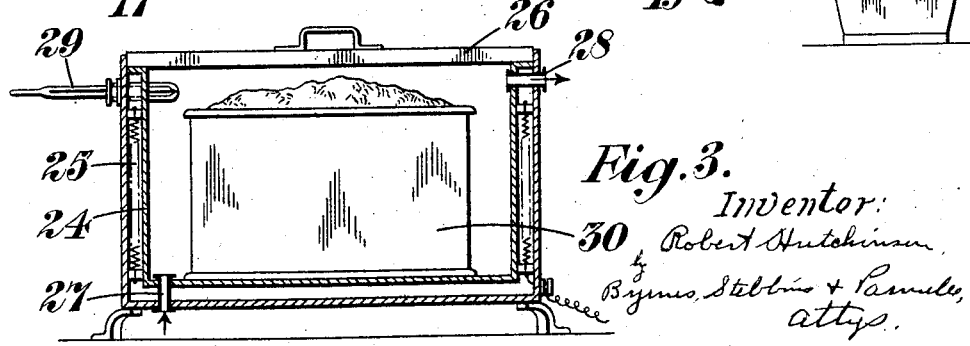
Inventor:
Robert Hutchinson
by Byrnes, Stebbins & Parmelee,
attys.

Patented July 5, 1927.

1,634,259

UNITED STATES PATENT OFFICE.

ROBERT HUTCHINSON, OF NOTTINGHAM, ENGLAND, ASSIGNOR TO WOODLANDS LIMITED, OF DOVER, ENGLAND, A BRITISH COMPANY.

HEAT TREATMENT OF WHEATEN CEREALS.

Application filed July 26, 1924, Serial No. 728,419, and in Great Britain July 30, 1923.

The present invention relates to a method of treatment of wheat, wheat flour and intermediate products and has for its object to increase the "strength" of wheaten cereals by means of a process which avoids the use of chemical additions to the flour.

It has been found that if flour is stored for some time—about three months for example—the strength, colour, acidity and moisture-absorbing capacity improve. It is also known that by raising the wheat to a temperature of 100° to 120° F. with the addition of a sufficient quantity of moisture the wheat is brought into a suitable condition for milling, and further, that this treatment may result in a slight increase of "strength" in the resulting flour, that is to say, the flour tends to give a bolder and better-risen loaf when it is made into dough and baked. This increase of strength, however, is not very substantial and the object of the present invention is to devise a process whereby a really substantial increase of "strength" can be obtained without resort to chemical "improvers" as hitherto.

If flour is heated to a sufficient degree for a sufficient time, it may become so affected that when made into dough with water, left for, say, one hour in water and then washed in running water the gluten washes away with the starch and none is retained in the hand. This procedure may be described as a washing test. The fact that the gluten is entirely washed away in the hand indicates, as is the fact, that the flour cannot be satisfactorily made into bread. The present invention is based on the discovery that if the flour so treated and rendered useless is mixed with a quantity of untreated flour, almost the whole of the gluten, both in the treated and in the untreated portion is recovered in a washing test as above described; that is to say, the gluten is, under these conditions, available to cause the dough to stand up properly. Moreover, it is found that the "strength" of the blend is very much greater than that of untreated flour.

For example, in a particular case of flour made from English wheat, originally yielding 12.2% of dry gluten but so heated that the gluten was all washed away with the starch in a washing test, when the treated flour was mixed with an equal quantity of the same flour untreated, a product resulted which in a washing test gave 11.7% of dry gluten retained in the hand. Assuming all the gluten from the untreated flour was retained it will be seen that 11.2% of the gluten from the treated flour must also have been retained and that the net loss of gluten due to the heat treatment was only ½% of the total product. At the same time the strength of the flour was much improved so that upon the whole the product was superior to untreated flour.

The present invention therefore comprises in the manufacture of wheaten flour the combination of steps consisting in so heating a wheaten cereal as to render substantially all the gluten nonretainable in a washing test as described without substantially affecting the starch particles, and blending a proportion of such cereal with a proportion of cereal not so treated.

In one form of the process the cereal to be heat-treated is heat-treated in berry-form in a hydrolyzer or conditioner for a sufficient time and at a sufficient temperature to render the gluten non-retainable as described.

The cereal, may, however, be heated in the form of flour, if desired. In one form of the process, it may be heated in a closed vessel so as to reach a temperature exceeding 50° C. (preferably 80° C.) for a sufficient time to render the gluten non-retainable, as above described, and thereafter be immediately cooled.

The portion of the cereal to be heated may be heated in a worm conveyor (for example a water-jacketed worm) so that it is uniformly heated throughout its substance for a predeterminable time.

Alternatively, the portion of the cereal to be heated may be heated under conditions permitting evaporation of moisture at a temperature exceeding 50° C. (preferably 80°–100° C.) and be held at this temperature for a sufficient time to render the gluten non-retainable as above described.

The accompanying drawings, which are purely diagrammatic, illustrate the various methods of carrying the invention into effect.

In the drawings:

Fig. 1 is a vertical cross section through a water bath containing a flour heating cell;

Fig. 2 is a vertical section through a jacketed apparatus for the continuous heat treatment of cereal;

Fig. 3 is a vertical cross section through a treating oven; and

Fig. 4 is a diagram showing the various steps of the process.

Example I.

Referring to Figure 1 the water bath 10 heated by a burner 11 contains a closed tubular vessel 12 the diameter of which, for experimental purposes, may be between 1 and 2 inches. The vessel 12 contains a thermometer 13.

In one example of the process using English wheat-flour in the vessel 12 the water bath 10 was raised to a temperature between 95° and 100° C. and the vessel 12 was then introduced into the bath. Immediately on the thermometer reaching 80° C. which took place in about ten minutes, the flour was cooled.

Upon blending about equal proportions with untreated wheat-flour of the same kind it was found that the blend was superior to untreated flour in strength.

Other flours or different samples of English flour might require a variation of time and temperature. In any case the treatment must be such that the gluten becomes substantially non-retainable in washing, as described.

Example II.

Referring to Figure 2 the apparatus shown comprises a tubular conveyor 15 containing a rotatable feed worm 16. The conveyor is surrounded by a water-jacket 17 having an inlet 18 for hot water and an outlet 19. There is a hopper 20 for the introduction of the cereal. The conveyor tube 15 is extended beyond the water-jacket and the feed worm 16 and the extended portion which is surrounded with lagging 21 terminates in an outlet 22 to a hopper 23.

In use of this apparatus, the temperature of the water-jacket is raised so that the walls of the conveyor 15 are several degrees in excess of 80° C. The rate of revolution of the worm is made variable by suitable means, not illustrated, and is so adjusted that cereal fed in at 20 will attain the desired temperature within the water-jacketed portion of the worm and will remain under treatment for a sufficient time to bring it into the proper condition. The worm helps to agitate the cereal and to assist the passage of heat into it so that it may be uniformly heated. The cereal is cooled upon issue from the conveyor by cooling devices well known in the art.

Wheat or flour may be fed into such a conveyor and the test of whether the treatment is complete is whether flour milled from the wheat after the passage through the conveyor or flour which has itself been passed through the conveyor are in the condition in which substantially all the gluten is carried away with the water and the starch in a washing test as above described.

The product of the treatment is, as before, blended with untreated cereal either in the berry stage or after milling.

An apparatus of this kind practically excludes air currents, although permitting free egress of any vapours formed.

Example III.

Referring to Figure 3, this illustrates diagrammatically an electric oven 24 having heating elements 25, a lid 26, air inlet 27, air outlet 28 and thermometer 29 for indicating the temperature. Flour is placed in the oven in an open vessel 30. It is preferable that this should be a shallow pan. Evaporation can consequently take place freely. Air is allowed to pass freely into the oven through the inlet 27 to assist evaporation, but does not pass through the flour.

In a particular case, the indicated temperature of the oven was 110° C. but the flour may not have attained so high a temperature owing to the air current and other causes. The treatment was continued for a period of 1½ hours to 2 hours. At the end of this time is was found that the moisture content had dropped to about 2% and the gluten had become completely removable in a washing test.

The treated flour was blended with untreated flour as before with similar results.

Example IV.

Referring to Figure 4 which is a flow sheet indicating diagrammatically the principal steps in carrying the process into effect in connection with a heat-treating apparatus of the same type as an ordinary hydrolyzer or conditioner, it will be seen that wheat is fed from the wheat bin 31 to the conditioner 32 used as the heat-treater. Here it is raised to a temperature of about 80° C. instead of raising it to the usual 40° C., and the wheat is retained under treatment a sufficient time for this rise of temperature to occur. If necessary, the wheat is retained in the heat-treater for a further period but in any case the treatment is continued until the wheat attains the condition in which flour made therefrom will leave no gluten in the hand in a washing test. In the heat-treater the wheat may be sprayed with water sufficient to bring it into proper condition for milling. It is then passed to the mill 33 and finally to the blender 34.

Other wheat is simply passed through the ordinary conditioning process in the conditioner 35 milled in the mill 36 and passed to the blender 34. In the blender the flour from the heat-treater and the untreated wheat are blended together. Alternatively the treated and untreated wheats may be blended before milling and milled together. Instead of raising the temperature in the heat-treater 32 to 80° C. a higher or a lower temperature might be employed with correspondingly shorter or longer treatment respectively. The blended product will be found to be of superior "strength."

In whatever way the treatment is carried out the product may be sprayed for the purpose of adding moisture evaporated during treatment and diastase may be added in some convenient form as some is probably lost during treatment. It will be understood that in the foregoing description the expression "untreated wheat" or "untreated flour" means wheat or flour from which the gluten has not been substantially rendered non-retainable in a washing test as described.

There is reason to believe that different wheats require very different times and temperatures of treatment and that the resultant increase in strength is not the same with all wheats. English wheat appears to require less treatment than wheats such as "Manitoba," "Plates" and "Australian." Suitable times and temperatures are matters for simple experiment in any particular case. The term "dry-heating" is employed herein as excluding steaming or any process in which sufficient moisture is used to gelatinize the starch.

What I claim as my invention and desire to secure by Letters Patent is:—

1. In the manufacture of wheaten flour the combination of steps consisting in so dry heating a wheaten cereal as to render substantially all the gluten non-retainable in a washing test as described without substantially affecting the starch particles, and blending a proportion of such cereal with a proportion of cereal not so treated.

2. In the manufacture of wheaten flour the combination of steps consisting in dry heating a wheaten cereal to a temperature lying between 50° and 100° C. for a sufficient time to render substantially all the gluten non-retainable in a washing test as described without substantially affecting the starch particles and blending a proportion of such cereal with a proportion of cereal not so treated.

3. In the manufacture of wheaten flour the combination of steps consisting in dry heating wheat in the berry-form to a temperature lying between 50° and 100° C. for a time sufficient only to render substantially all the gluten non-retainable as described, and thereafter immediately cooling said wheat and blending it with a proportion of cereal not so heat-treated.

4. In the manufacture of wheaten flour the combination of steps consisting in dry heating wheat in the berry-form to a temperature lying between 50° and 100° C. for a time sufficient only to render substantially all the gluten non-retainable as described, and thereafter immediately cooling said wheat, milling said wheat into flour and blending it with a proportion of flour not so heat-treated.

5. In the manufacture of wheaten cereal the combination of steps consisting in introducing a wheaten cereal into a vessel by which currents of air are excluded from the flour, raising the temperature of the vessel until it exceeds 50° C., maintaining such temperature for a time sufficient only to render the gluten non-retainable in a washing test as described and thereafter cooling the cereal and blending it with a proportion of cereal not so heat-treated.

6. In the manufacture of wheaten cereal the combination of steps consisting in introducing a wheaten cereal into a vessel by which currents of air are excluded from the flour, raising the temperature of the vessel until it exceeds 50° C., maintaining such temperature for a time sufficient only to render the gluten non-retainable in a washing test as described and thereafter cooling the cereal, milling it into flour and blending a proportion of such flour with a proportion of flour not so treated.

7. In the manufacture of wheaten flour, the steps consisting in passing the wheaten cereal through a heated zone, applying heat thereto by conduction from the exterior of the zone, the rate of passage and the length of zone being so regulated that the cereal becomes substantially uniformly heated throughout its substance to a temperature exceeding 50° C. for a time insufficient to affect the starch particles but sufficient to render gluten non-retainable in a washing test, thereafter passing such cereal into a cooling zone and mixing said treated cereal with a portion of cereal not so treated.

In testimony whereof I affix my signature.

ROBERT HUTCHINSON.